United States Patent [19]

Haynes

[11] 3,736,689
[45] June 5, 1973

[54] MOLE TRAP

[76] Inventor: Robert E. Haynes, 1925 Mill Road, South Pasadena, Calif. 91030

[22] Filed: May 11, 1970

[21] Appl. No.: 36,293

[52] U.S. Cl..............................................43/77, 43/94
[51] Int. Cl..............................................A01m 23/36
[58] Field of Search.......................43/77, 79, 80, 81, 43/81.5, 88, 92, 94

[56] References Cited

UNITED STATES PATENTS

| | | | |
|---|---|---|---|
| 150,682 | 5/1874 | Gass | 43/94 |
| 326,864 | 9/1885 | Hallidie | 43/94 |
| 1,135,626 | 4/1915 | Schreck | 43/94 |
| 1,762,783 | 6/1930 | Kascak | 43/94 |
| 2,222,653 | 11/1940 | Chambless et al. | 43/94 |
| 2,752,723 | 7/1956 | Lutsky | 43/85 |

FOREIGN PATENTS OR APPLICATIONS 3,894  12/1904  Great Britain

*Primary Examiner*—Hugh R. Chamblee

[57] ABSTRACT

The invention comprises of a U-shaped steel spring with pointed ends mounted within a housing. The pointed ends of the steel spring tending to close when not held in the open position. The pointed ends of the steel spring being being held in the open position by an in-line hinged bar; the in-line hinged bar being tripped to an off position by depressing a trip bar.

1 Claim, 4 Drawing Figures

PATENTED JUN 5 1973 3,736,689
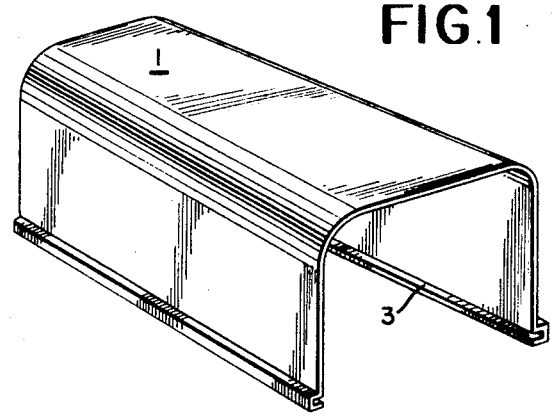
FIG.1
FIG.2
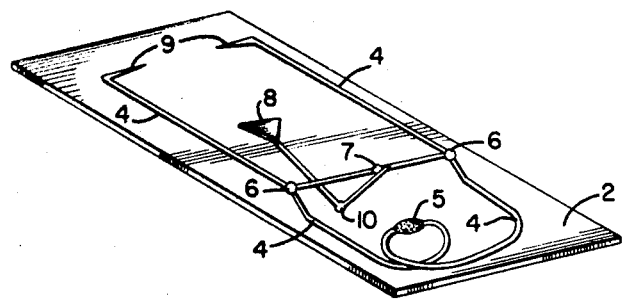
FIG.3
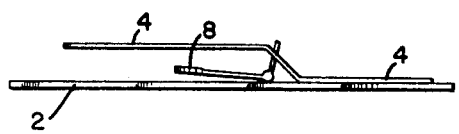
FIG.4
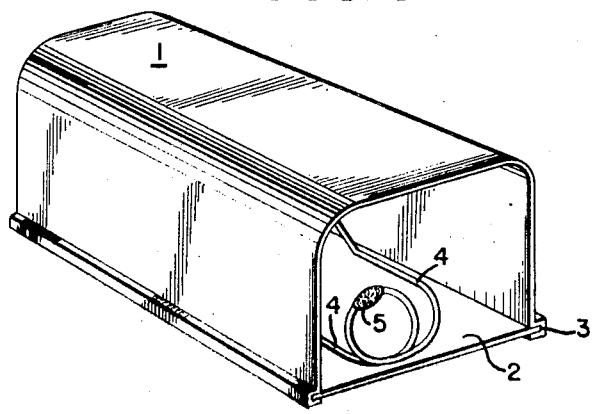

MOLE TRAP

This invention relates to a mole trap designed and constructed specifically for trapping moles as they tunnel along underneath the top surface of the ground. Since Moles always work slightly underneath the surface of the ground and will not expose themselves to the open space, it is the purpose of the invention to be buried in the earth in line with the Mole tunnel and slightly covered back over with the dirt of the earth so that when the mole comes back along his tunnel he will enter the Mole trap and be trapped.

With the above and other objects in view, which will appear as the description proceeds, the invention resides in the combination and arrangement of the parts and in the details of the construction hereinafter described and claimed, it being understood that changes in the precise embodiment of the invention hereinafter disclosed, may be made within the scope of what is claimed, without departing from the spirit of the invention.

In the accompanying drawings:

FIG. 1 shows the top housing removed.

FIG. 2 shows the base plate and the trap mechanism installed.

FIG. 3 shows a side view of the base plate and trap spring.

FIG. 4 shows the top housing mounted over the base plate.

Referring to the FIG. 1, the numeral 1 is a removable top housing. The numeral 3 indicates a groove which slides over the edge of the base plate 2, in FIG. 4. In the FIGS. 2, 3 and 4 the numeral 2 is the main supporting base plate.

The numeral 4 is a formed steel spring welded to the base plate 2 as shown by the numeral 5. The steel spring 4 is formed to normally close the sharp ends 9 together. The steel spring 4 is held apart by the hinged trip-latch 7, which is held in place by the pin-joints 6 attached to the steel spring 4.

A trip-bar 8 is mounted directly under the hinged trip-latch 7. As the trip-bar 8 is slightly depressed, the trip-bar 8 pushes the trip-latch 7 forwardly off dead-center, causing the steel spring 4 to quick-close and trap the mole between the sharp ends 9.

The trip-bar 8 is held in place to the base plate 2 at the pin-joint 10. The steel spring 4 is off-set part way along each side to raise the sharp end of the steel spring 4 the desired height above the base plate 2.

In operation the mole trap is set for action by pushing the trip-latch 7 into a straight position between the pin joints 6, which pushes the steel spring 4 outwardly and holds the sharp ends 9 of the steel spring 4 widely apart.

When the mole trap is set, the housing 1 is placed over the base plate 2, as shown in the FIG. 4. The complete unit is then placed in line with the mole tunnel and slightly covered over with the dirt of the earth. When the mole returns along his tunnel and enters the housing 1 and depresses the trip-bar 8, the trip-latch 7 will be released, tripping the steel spring 4 into closing the sharp ends 9 together and thereby trapping the mole.

Having thus described the invention, what is claimed is:

1. A tray device comprising a base plate, a spring trap means having a coiled end portion secured with said base plate, said spring trap means including a pair of legs portions biased together extending upwardly and along said base plate and terminating with inwardly directed pointed ends, a trip-latch means pivotally connected with said leg portions substantially midway thereof to maintain the leg portions in set spaced relation, said trip-latch means having a center pivotally connection, a trip-bar pivotally connected with said base plate and located below said trip-latch, said trip-bar having an actuation portion extending toward said pointed ends and an upstanding portion adapted to move the center pivoted connection off dead center when an animal strikes the actuation portion of said trip-bar, whereby the biased leg portions are released and the pointed ends will impale an animal, and a removable housing open at each end adapted to slidably receive the base plate by means of grooves provided therein,.

* * * * *